United States Patent [19]

Smith

[11] Patent Number: 5,106,174
[45] Date of Patent: Apr. 21, 1992

[54] IDEAL DISTRIBUTION CHMSL HOLOGRAM WITH DOUBLE EXPOSURE TECHNIQUE

[75] Inventor: Ronald T. Smith, Torrance, Calif.

[73] Assignee: Hughes Aircraft Company, Los Angeles, Calif.

[21] Appl. No.: 510,318

[22] Filed: Apr. 16, 1990

[51] Int. Cl.⁵ .................. G02B 5/32; G03H 1/26; G03H 1/28
[52] U.S. Cl. ...................... 359/19; 359/15; 359/24; 359/900
[58] Field of Search .............. 350/3.7, 3.72, 3.73, 350/3.77, 3.75

[56] References Cited

U.S. PATENT DOCUMENTS

| | | | |
|---|---|---|---|
| 3,515,452 | 6/1970 | Pole | 350/3.77 |
| 3,536,371 | 10/1970 | Post | 350/3.73 |
| 3,834,785 | 9/1974 | Kimura | 350/3.77 |
| 4,421,379 | 12/1983 | Gromet et al. | 350/3.72 |
| 4,687,282 | 8/1987 | Ferrante | 350/3.72 |
| 4,711,512 | 12/1987 | Upatnieks | 350/3.7 |
| 4,790,613 | 12/1988 | Moss | 350/3.7 |
| 4,795,223 | 1/1989 | Moss | 350/3.77 |
| 4,818,048 | 4/1989 | Moss | 350/3.7 |
| 4,916,593 | 4/1990 | Moss et al. | 350/3.7 |
| 4,966,426 | 10/1990 | Moss et al. | 350/3.7 |

Primary Examiner—Bruce Y. Arnold
Assistant Examiner—Martin Lerner
Attorney, Agent, or Firm—Leonard A. Alkov; Wanda K. Denson-Low

[57] ABSTRACT

A hologram that diffracts playback illumination over a wide angular range made pursuant to a technique that includes the steps of first exposing a volume hologram recording medium to record a first image which upon playback will diffract light over a first angular coverage, and then exposing the volume hologram recording medium to record a second image which upon playback will diffract light over a second angular coverage.

10 Claims, 2 Drawing Sheets

⓵ = CANDELAS

IDEAL DISTRIBUTION CHMSL HOLOGRAM WITH DOUBLE EXPOSURE TECHNIQUE

BACKGROUND OF THE INVENTION

The disclosed invention is directed generally to holograms for center-high mounted stop lights for vehicles, and more particularly to a hologram that efficiently meets the required brightness and angular coverage and to a double exposure technique for recording such hologram.

Present federal regulations require center-high mounted stoplights (CHMSLs) in addition to the standard stoplights mounted in the rear portion of an automobile. The high mounted stoplights are intended to maximize the visibility of the automobile braking indicators to drivers following the braking vehicle, and are commonly mounted on the rear window of an automobile.

High mounted stoplights have commonly been implemented as a standard lenticular lens and an illuminating incandescent bulb enclosed in a housing that is typically secured adjacent the top or bottom of an automobile rear window. However, the bulky housing partially obscures the rearward vision of the driver, and moreover imposes limitations on the design of the automobile.

Center high mounted stoplights have been also integrated into automobile body parts such as rear decks, spoilers, roofs, which to some degree substantially reduce or remove the rearward vision problem. However, such stoplights are complex and may impose limitations on the design of the automobile.

Holographic center-high mounted stoplights have also been developed in order to efficiently meet the stoplight regulations. The hologram for holographic center-high mounted stoplights is typically a diffusion hologram or an image hologram that contains the image of a lenticular lens.

A consideration with holograms for holographic center-high mounted stoplights are the luminous intensity and angular coverage requirements. Such requirements generally include a quantitative aspect that defines luminous intensity over a defined solid angular range, and a qualitative aspect that requires visibility over a horizontal angular range that is greater than the horizontal component of the defined solid angular range. Essentially, the regulations require a brighter region generally in the center of the angular region of coverage.

A straightforward procedure for recording a hologram for a center-high mounted stoplight would be to record the image of a lenticular lens array that spreads light uniformly over a selected angular coverage (e.g., two lenticular arrays rotated 90 degrees with respect to each other and laminated together). If a relatively narrow angular coverage is selected so as to meet the central region luminous intensity requirements, the visibility requirement over the extended horizontal angular range might not be met. If a lenticular lens array of wider angular coverage is utilized, a stronger playback source would have to be utilized to meet the central luminous intensity requirements since the illumination would be diffracted uniformly over the selected angular coverage that is greater that the central region.

A further approach would be to utilize a lenticular lens array having a cylindrical lens facets configured so that the refracted output light was concentrated mostly in the center and less in the region outside the center. A consideration with such arrays include complexity and cost.

SUMMARY OF THE INVENTION

It would therefore be an advantage to provide a hologram for a vehicle center-high mounted stoplight that provides the desired luminous intensity distribution without requiring an excessive amount of playback illumination.

A further advantage would be to provide a technique for recording a hologram having specific luminous intensity requirements over a relatively large angle of coverage.

The foregoing and other advantages are provided in a hologram made pursuant to a technique that includes the steps of first exposing a volume hologram recording medium to record a first image which upon playback will diffract light over a first angular coverage, and then exposing the volume hologram recording medium to record a second image which upon playback will diffract light over a second angular coverage.

BRIEF DESCRIPTION OF THE DRAWING

The advantages and features of the disclosed invention will readily be appreciated by persons skilled in the art from the following detailed description when read in conjunction with the drawing wherein.

DETAILED DESCRIPTION OF THE DISCLOSURE

Figure 1:
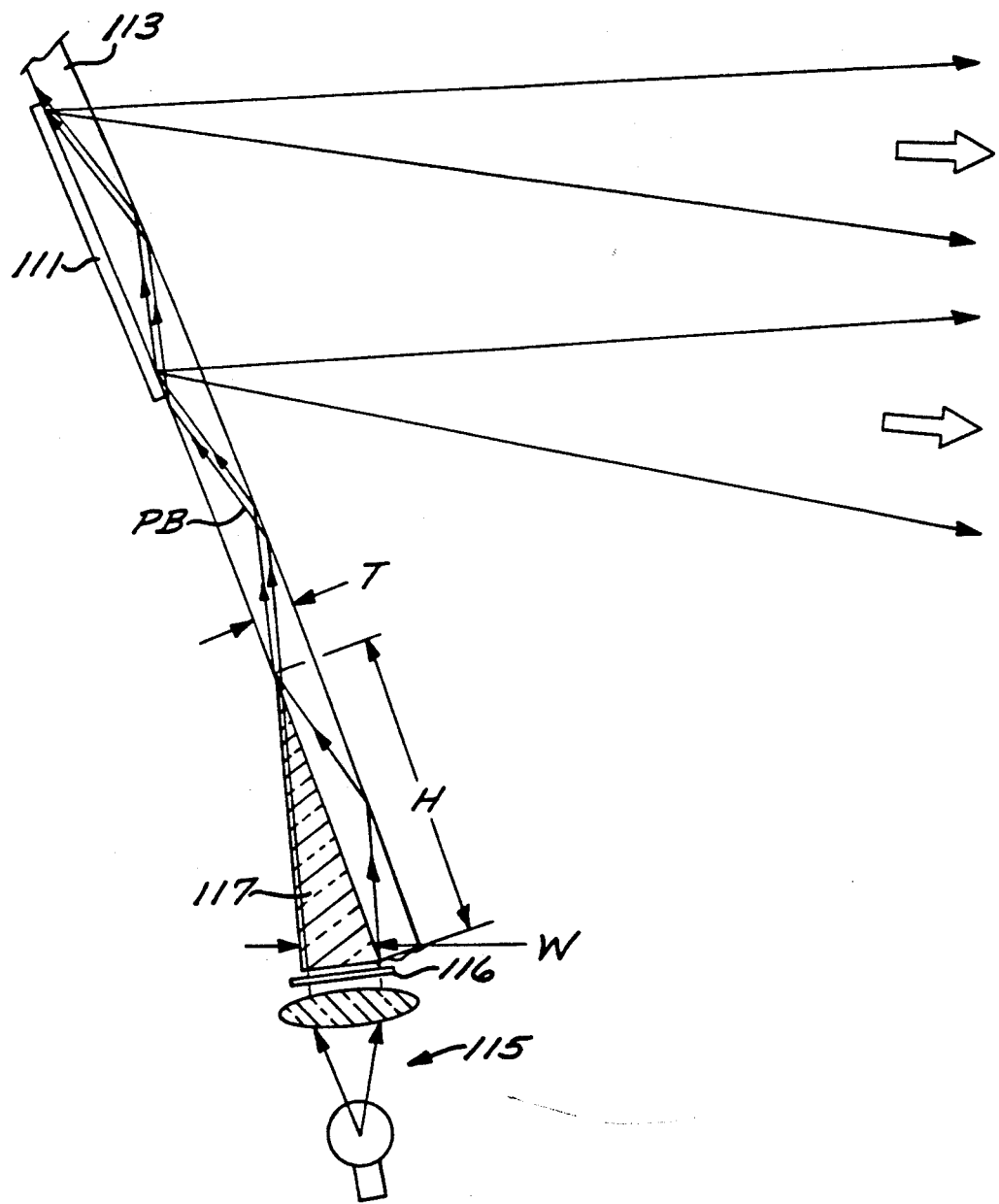
FIG. 1 is a schematic elevational, sectional view depicting a trapped beam holographic stoplight system in which a hologram in accordance with the invention can be utilized.

In the following detailed description and in the several figures of the drawing, like elements are identified with like reference numerals.

Referring now to FIG. 1, schematically shown therein is a side elevational view of a trapped beam holographic stoplight system in which a hologram in accordance with the invention can be utilized. The holographic stoplight system includes a hologram structure 111 that is secured to the inside surface of the rear window 113 of a vehicle. The hologram structure 111, which can comprise a transmission hologram or a reflection hologram, produces stoplight illumination in response to playback illumination PB which propagates to the hologram structure 111 via substantially total internal reflections within the rear window 113.

The playback illumination is provided by a light source 115 and a filter 116 that provides the appropriate range of wavelengths. The light source 115 is connected to the brake light actuating circuit of the automobile so as to be energized when the brake pedal is depressed. The filter 116 can be a high pass filter or a narrow band filter, depending upon stoplight image sharpness requirements, which in combination with the light source 115 provide the appropriate luminous intensity spectral bandwidth to comply with the federal stoplight specifications.

By way of particular example, for a hologram where the hologram image is focussed in the hologram plane, a high pass filter having a cutoff wavelength of about 600 nanometers (nm) would produce an image that will be perceived as red, with the apparent peak luminous intensity being somewhere between about 600 nm and 620 nm. For holograms wherein the hologram image is focussed away from the hologram plane and certain image sharpness requirements exist, the luminous spectral bandwidth may need to be reduced below that which occurs with a high pass filter, and a narrow band-pass filter would be utilized.

The output of the filter 116 is coupled into the lower portion of the rear window 113 by a prism 117 which is laterally coextensive (i.e., in the horizontal direction as oriented in a vehicle) with the hologram structure 111.

Particular implementations of trapped beam holographic stoplight systems are disclosed in commonly assigned U.S. Ser. No. 07/510,319, entitled "TRAPPED BEAM HOLOGRAPHIC CENTER HIGH MOUNTED STOPLIGHT," concurrently filed herewith, and incorporated herein by reference.

Figure 2:
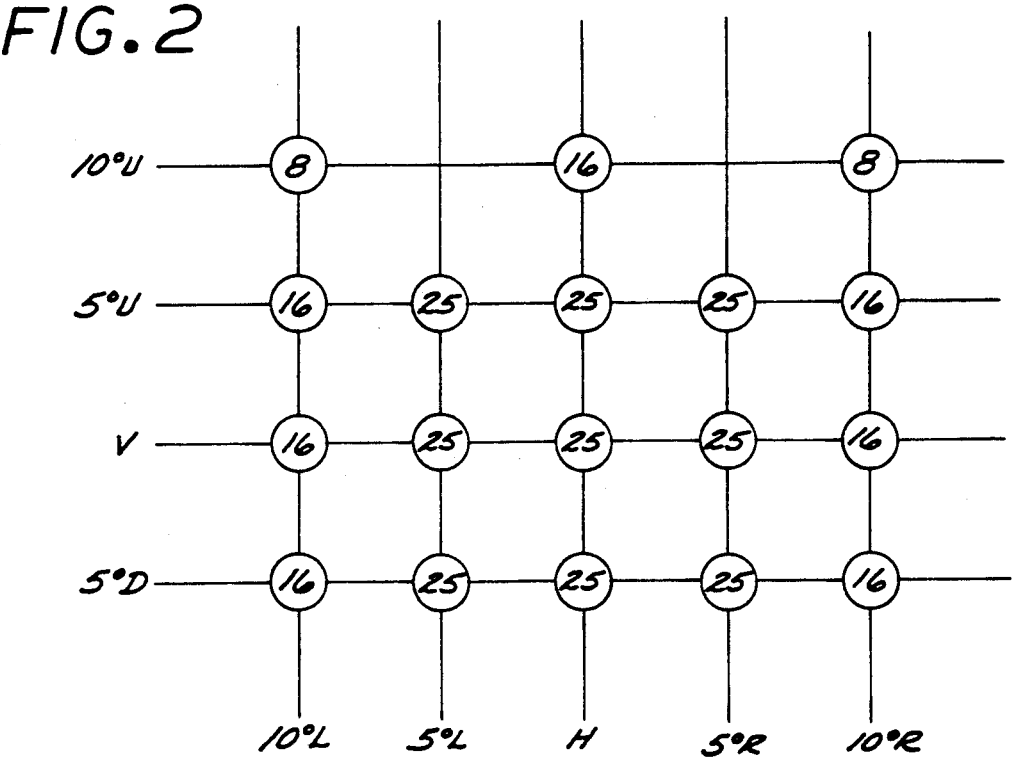
FIG. 2 is a luminous intensity distribution graph depicting present vertical and horizontal requirements in candelas for center-high mounted stoplights.

Referring now to FIG. 2, set forth therein is a graph showing the luminous intensity (in candelas) versus angular field requirements for a center-high mounted stoplight for the field defined as (a) 10 degrees up and 5 degrees down relative to the central horizontal plane, and (b) 10 degrees left and right relative to the central vertical plane, as set forth in Federal Motor Vehicle Safety Standards No. 108. The numbers in the graph identify the minimum luminous intensities at those angular locations in candelas, and the entire angular field is subject to a 160 candela maximum at any given angular position.

In addition to the foregoing quantitative requirements, there is the qualitative requirement that the stoplight be visible within the central horizontal plane over a range of 45 degrees on either side of the central vertical plane. By way of example, this qualitative requirement can be interpreted requiring a luminous intensity of about 1 candela.

In accordance with the invention, the hologram structure for a stoplight is exposed twice: first to record an image that would meet the central luminous intensity distribution defined by the graph of FIG. 2; and secondly, to record an image that would meet the requirement of horizontal visibility beyond the angular coverage called for by FIG. 2. By way of illustrative example, the first exposure can be for a wide field of view array such as a 50 degree by 10 degree lenticular lens array to cover the plus/minus 45 degree requirement. The second exposure for a narrower field of view array such as a 14 degree by 6 degree lenticular lens array to meet the luminous intensity requirements depicted in FIG. 2. The exposure intensities for each of the two exposures are adjusted empirically, with the general consideration that the narrow field of view exposure intensity being much higher than the wide field of view exposure, so as produce on playback a diffracted pattern that is most concentrated in the center, with smaller amounts at 45 degrees on either side of the central vertical plane.

Figure 3:
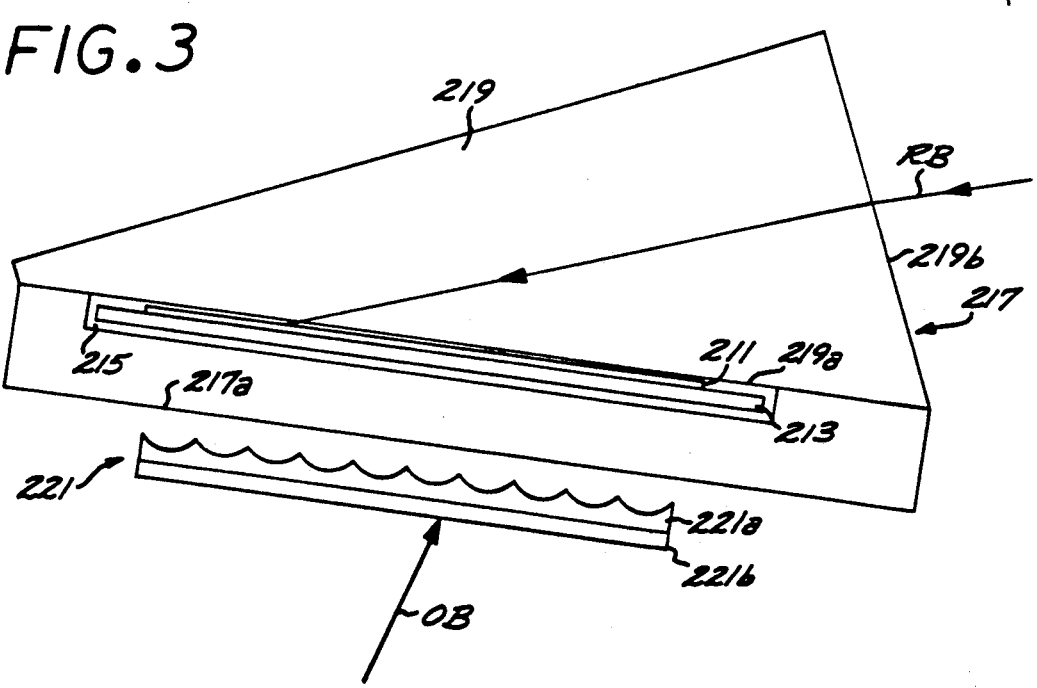
FIG. 3 depicts an exposure setup for providing each of the two exposures of a hologram recording medium in accordance with the invention.

Referring now to FIG. 3, shown therein is an illustrative example of an exposure setup that can be utilized to provide the double exposure in accordance with the invention.

A hologram recording plate including a holographic recording layer 211 and a transparent supporting substrate is supported in the opening 215 of an oil gate trough 217 which is filled with refractive index matching fluid. By way of illustrative examples, the holographic recording layer comprises dichromated gelatin or a photopolymer of a block prism 219, and the recording medium is supported parallel to the face 219a.

The oil gate trough 217 also includes an outside surface 217a that is parallel to the wedge prism face 219a that forms one side of the oil gate trough opening 215.

The exposure set up further includes a lenticular lens array 221 that is parallel to the oil gate trough surface 217a, and is spaced therefrom by an air gap. By way of illustrative example, the lenticular lens array 221 includes a negative plano-concave cylindrical lens array 221a that is laminated with a positive plano-convex cylindrical lens array 221b with their longitudinal axes at 90 degrees to each other. The plano-concave cylindrical lens array 221a is for dispersing light in the vertical direction, while the plano-convex cylindrical lens array is for dispersing light in the horizontal direction.

It should be appreciated that other configurations of cylindrical lens arrays having orthogonally oriented longitudinal axes can be utilized for the lenticular lens array 221. For example, both cylindrical lens arrays can be positive, or both can be negative. Also, the cylindrical lens arrays can be separated by an air gap, in which case appropriate anti-reflection coatings would be utilized.

Respective collimated beams are utilized for producing a reference beam RB and an object beam OB. Preferably, such beams originate from the same laser source whose output is split by a beamsplitter. The beamsplitter outputs are made to diverge by respective diverging optics, such as an objective lens and a pinhole diaphragm. The respective diverging beams as then collimated by respective collimating optical elements.

The collimated beam for the reference beam is coupled to the recording medium via the prism face 219b at an angle that is appropriate for the intended playback geometry, which will typically be large as measured relative to normal.

The collimated beam for the object beam is directed to the lenticular lens array 221 at an angle based on the required directionality of the diffracted playback illumination, with appropriate regard for the angular orientation of the rear window on which the hologram will be mounted.

For the first exposure, the lenticular lens array utilized would have the appropriate characteristics for the wide coverage, while for the second exposure the lenticular lens array utilized would have the appropriate characteristics for the narrow coverage.

The foregoing has been a disclosure of a hologram structure for a vehicle center high mounted stoplight that provides the requisite angular coverage without requiring excessive playback illumination intensity, and also of a technique for recording a hologram having specific luminous intensity requirements over relatively large angle of coverage.

Although the foregoing has been a description and illustration of specific embodiments of the invention, various modifications and changes thereto can be made by persons skilled in the art without departing from the scope and spirit of the invention as defined by the following claims.

What is claimed is:

1. A process for recording a hologram comprising the steps of:

first exposing a volume hologram recording medium with a first exposure intensity to record a first image which, upon playback, will diffract light over a first angular region of coverage such that the diffracted light has a first predetermined luminous intensity distribution over the first angular region of coverage; and secondly exposing the volume hologram recording medium with a second exposure intensity to record a second image which upon playback will diffract light over a second angular region of coverage such that the light diffracted by the second image has a second predetermined luminous intensity distribution over the second angular region of coverage, wherein the second luminous intensity distribution is different from the first luminous intensity distribution.

2. The process of claim 1 wherein said step of first exposing includes the step of providing an object beam that is the output of a first lenticular lens array, and wherein the step of secondly exposing includes the step of providing an object beam that is the output of a second lenticular lens array.

3. The process of claim 2 wherein said step of first exposing further includes the step of providing a reference beam at an angle to allow for playback with an incidence angle relative to normal that will provide for total internal reflection within a substrate that supports the hologram.

4. The process of claim 3 wherein said step of secondly exposing further includes the step of providing a reference beam at an angle to allow for playback with an incidence angle relative to normal that will provide for total internal reflection within a substrate that supports the hologram.

5. The process of claim 1 wherein the first angular region of coverage is within the second angular region of coverage, and wherein the luminous intensities in the first luminous intensity distribution are greater that the luminous intensities in the second luminous intensity distribution.

6. A hologram made pursuant to a process comprising the steps of:

first exposing a volume hologram recording medium with a first exposure intensity to record a first image which, upon playback, will diffract light over a first angular region of coverage such that the diffracted light has a first predetermined luminous intensity distribution over the first angular coverage; and secondly exposing the volume hologram recording medium with a second exposure intensity to record a second image which upon playback will diffract light over a second angular region of coverage that is greater than and encompasses the first angular region coverage such that the light diffracted by the second image has a second predetermined luminous intensity distribution over the portion of the second angular region of coverage that is beyond the first angular region of coverage, wherein the second luminous intensity distribution is different from the first luminous intensity distribution.

7. The hologram of claim 6 wherein the first image recorded is the output of a first lenticular lens array, and wherein the second image recorded is the output of a second lenticular lens array.

8. The hologram of claim 6 wherein the first angular region of coverage is within the second angular region of coverage, and wherein the luminous intensities in the first luminous intensity distribution are greater that the luminous intensities in the second luminous intensity distribution.

9. A hologram comprising:

a first recorded image which, upon playback, provides diffracted light having a first predetermined luminous intensity distribution over a first angular region of coverage; and a second recorded image which, upon playback, provides diffracted light having a second predetermined luminous intensity distribution, different from said first predetermined luminous intensity distribution, over a second angular region of coverage.

10. The hologram of claim 9 wherein the first angular region of coverage is within the second angular region of coverage, and wherein the luminous intensities in the first luminous intensity distribution are greater than the luminous intensities in the second luminous intensity distribution.

* * * * *